A. SPERRY.
Fenders for Vehicles.
No. 148,769.  Patented March 17, 1874.
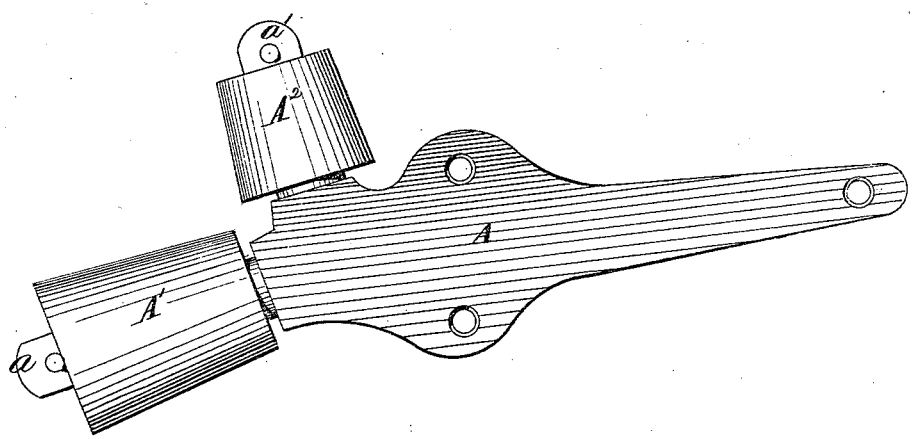
FIG I
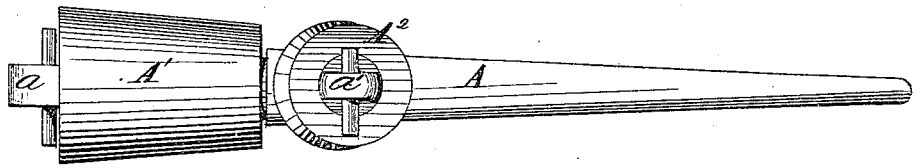
FIG II

UNITED STATES PATENT OFFICE.

AURELIUS SPERRY, OF TREMONT, ILLINOIS.

IMPROVEMENT IN FENDERS FOR VEHICLES.

Specification forming part of Letters Patent No. 148,769, dated March 17, 1874; application filed October 17, 1873.

*To all whom it may concern:*

Be it known that I, AURELIUS SPERRY, of Tremont, in the county of Tazewell and State of Illinois, have made a certain Improvement in Chafing-Irons for Vehicles, of which the following is a full, clear, and exact description, reference being had to the annexed drawing, in which—

Figure 1 represents a plan view of my improved chafing-iron for vehicles, and Fig. 2 a side view of the same.

Corresponding parts in the two figures are designated by similar letters.

This invention relates to a certain improvement in chafing-irons for vehicles; and it consists of a plate or bar, having two arms or axes disposed at about right angles to one another and armed with frictional rollers, substantially as hereinafter more fully set forth.

To enable others to make and use my invention, I will proceed to describe it.

In the annexed drawing, A refers to a plate or bar, suitably punctured to receive screws or other fastenings for securing it to the under side of the bottom of the vehicle, in such a manner as that, in turning the latter, its wheel will strike on its periphery against one of the rollers thereof, and on its inner side against the other roller of the same. $a$ $a'$ are two arms or axes, formed with or otherwise supplied to the plate A at about right angles to each other, one extending nearly in a direction with the length of the said plate, and the other transversely thereto. These arms or axes are armed with frictional rollers $A^1$ $A^2$, held thereon by pins passing transversely through said arms, or by other suitable means.

It will be observed that, through this construction and arrangement of parts, the wheel will not only be prevented from chafing the vehicle, but, by reason of the side roller $A^2$, which acts also to reduce friction, the corner or edge of the periphery of the wheel will be kept from tearing or cutting the vehicle, or even iron, when it is clad with such, the wheel being prevented from coming in contact therewith.

Having thus described my invention, what I claim, and desire to secure by Letters Patent, is—

The chafing-iron for vehicles, composed of the plate A, having the arms $a$ $a'$ disposed at right angles to each other and armed with the frictional rollers $A^1$ $A^2$, all combined substantially as set forth.

In testimony whereof I have hereunto signed my name this 13th day of October, 1873, in the presence of two subscribing witness.

AURELIUS SPERRY.

Witnesses:
 W. F. HENRY,
 H. T. SPERRY.